United States Patent
Arora et al.

(10) Patent No.: US 12,002,017 B2
(45) Date of Patent: Jun. 4, 2024

(54) METHOD AND SYSTEM FOR MULTI-ACCOUNT CHECK PROCESSING VIA BLOCKCHAIN

(71) Applicant: MASTERCARD INTERNATIONAL INCORPORATED, Purchase, NY (US)

(72) Inventors: Ankur Arora, New Delhi (IN); Rakesh Patel, Haryana (IN); Aditya Koduri, Haryana (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 29 days.

(21) Appl. No.: 17/704,504

(22) Filed: Mar. 25, 2022

(65) Prior Publication Data
US 2022/0215354 A1 Jul. 7, 2022

Related U.S. Application Data

(62) Division of application No. 16/142,185, filed on Sep. 26, 2018, now Pat. No. 11,308,460.

(51) Int. Cl.
*G06Q 20/04* (2012.01)
*G06Q 20/38* (2012.01)
*G06Q 20/40* (2012.01)

(52) U.S. Cl.
CPC ....... *G06Q 20/042* (2013.01); *G06Q 20/3825* (2013.01); *G06Q 20/3829* (2013.01); *G06Q 20/40* (2013.01); *G06Q 2220/00* (2013.01)

(58) Field of Classification Search
CPC ............. G06Q 20/042; G06Q 20/3825; G06Q 20/3829; G06Q 20/40; G06Q 2220/00
See application file for complete search history.

(56) References Cited

U.S. PATENT DOCUMENTS 9,240,088 B1 * 1/2016 Magnus ............ G06Q 20/4016
10,423,938 B1 * 9/2019 Gaeta ................ G06Q 20/042
(Continued)

OTHER PUBLICATIONS

Amir Goharshady et al., Secure Credit Reporting on the Blockchain, May 23, 2018, Arxiv.org, pp. 1-9 (Year: 2018).*

(Continued)

*Primary Examiner* — Nilesh B Khatri
(74) *Attorney, Agent, or Firm* — Panitch Schwarze Belisario & Nadel LLP

(57) ABSTRACT

A method for processing a multi-account check includes: receiving a first authorization request including a transaction amount, an account identifier, and a check number; identifying a blockchain associated with the account identifier including a plurality of blocks, each block including a block header and blockchain data values, and a blockchain data value included in one of the blocks including the check number; generating two or more additional authorization requests including a payment amount, an alternate account number, and an alternate check number, where the alternate account number included in each of the additional authorization requests is unique among the additional authorization requests and a total of the payment amount included in the additional authorization requests is based on the transaction amount; and transmitting each of the additional authorization requests to a financial institution associated with the alternate account number included in the respective additional authorization request.

10 Claims, 6 Drawing Sheets

(56) References Cited

U.S. PATENT DOCUMENTS

| | | | |
|---|---|---|---|
| 11,392,947 B1* | 7/2022 | Prasad | G06Q 20/40155 |
| 2006/0136332 A1* | 6/2006 | Ziegler | G06F 21/445 |
| | | | 705/39 |
| 2009/0299863 A1* | 12/2009 | Shah | G06Q 20/20 |
| | | | 705/16 |
| 2010/0235248 A1* | 9/2010 | Friedman | G06Q 20/042 |
| | | | 705/17 |
| 2011/0243394 A1 | 10/2011 | Matsuo et al. | |
| 2013/0048719 A1* | 2/2013 | Bennett | G06Q 20/3572 |
| | | | 235/380 |
| 2014/0297517 A1* | 10/2014 | Gnanasekaran | G06Q 20/227 |
| | | | 705/39 |
| 2019/0019171 A1* | 1/2019 | Silvestre | G06Q 20/385 |
| 2020/0311709 A1* | 10/2020 | White, III | G06Q 20/3224 |

OTHER PUBLICATIONS

Antonopoulos, Andreas M, "Mastering Bitcoin", O'Reilly Media Inc., First Edition, 2014.

* cited by examiner

METHOD AND SYSTEM FOR MULTI-ACCOUNT CHECK PROCESSING VIA BLOCKCHAIN

FIELD

The present disclosure relates to the processing of a multi-account check for a payment transaction involving a blockchain, specifically the use of a blockchain to store data related to checks that are drawn on multiple transaction accounts and the processing of a payment transaction funded via such a check.

BACKGROUND

As technology has improved, many payment methods utilized by consumers to fund payment transactions have similarly improved. For instance, payment cards have become more sophisticated and secure, due to improvements such as integrated circuit chips, account controls, and cards with physical switches to turn on or off the card and select the account to use. Likewise, mobile computing devices are configured to operate as payment instruments, and are being frequently updated with new features for use by consumers. However, checks have remained largely unchanged since their inception. The technology involved in the making of a check as well as the processing of a transaction funded via a check has had very little development in recent decades.

Many consumers desire convenience when utilizing a payment instrument. Payment cards provide convenience in their ease of use in addition to being compact and easy to care. Electronic wallets provide convenience in the ability to have multiple payment instruments utilized from a single mobile device, which the consumer is often already accustomed to carrying. Currently, checks lack in such convenience, particularly in cases where a consumer may desire to use multiple transaction accounts to fund a transaction. In traditional transactions, the consumer would be required to carry multiple checks, to independently fill out each of the checks, and present all of the checks to the merchant for processing of the transaction. For most consumers, filling out even a single check is already a lengthy process that takes longer than using any other payment instrument, so thus the prospect of having to fill out multiple checks is increasingly negative. In addition, the writing of multiple checks introduces additional opportunities for human error.

Thus, there is a need for a technological solution to enable a single check to be processed that draws on multiple transaction accounts for funding thereof, negating the need for a consumer to carry and fill out multiple checks.

SUMMARY

The present disclosure provides a description of systems and methods for processing a multi-account check in a payment transaction. Issuing institutions that issue checks to a consumer, or the consumer themselves, may register their issued checks. A unified, multi-account check is issued by a third party with the underlying information stored on a blockchain for security and to prevent any potential fraud on the part of the consumers or issuing institutions. The consumer is then free to use the multi-account check as a standard check in a payment transaction. Processing of the transaction leads to the transaction being routed to the third party, which can then independently process the transaction on every one of the underlying accounts, accomplishing the funding of the transaction via multiple transaction accounts using a single, unified check. This enables a consumer to conduct a payment transaction funded via multiple accounts through a single check, increasing efficiency when at a register, decreasing the opportunity for human error in the payment process, and providing greater convenience to the consumer.

A method for processing a multi-account check includes: receiving, by a receiver of a processing server, a first authorization request transmitted via payment rails, wherein the first authorization request is formatted according to one or more standards and includes a plurality of data elements configured to store transaction data, the transaction data including at least a transaction amount, an account identifier, and a check number; identifying, by a processing device of the processing server, a blockchain associated with the account identifier, wherein the blockchain includes a plurality of blocks, each block includes a block header and one or more blockchain data values, and a blockchain data value included in one of the plurality of blocks includes the check number; generating, by the processing device of the processing server, two or more additional authorization requests, wherein each of the additional authorization requests are formatted according to the one or more standards and includes a plurality of data elements configured to store at least a payment amount, an alternate account number, and an alternate check number, the alternate account number included in each of the additional authorization requests is unique among the additional authorization requests, and a total of the payment amount included in each of the additional authorization requests is based on the transaction amount; and electronically transmitting, by a transmitter of the processing server, each of the generated two or more additional authorization requests to a financial institution associated with the alternate account number included in the respective additional authorization request.

Another method for processing a multi-account check includes: receiving, by a receiver of a processing server, a first authorization request transmitted via payment rails, wherein the first authorization request is formatted according to one or more standards and includes a plurality of data elements configured to store transaction data, the transaction data including at least a transaction amount, an account identifier, and a check number; identifying, by a processing device of the processing server, a blockchain associated with the account identifier, wherein the blockchain includes a plurality of blocks, each block includes a block header and one or more blockchain data values, and a blockchain data value included in one of the plurality of blocks includes the check number; generating, by the processing device of the processing server, two or more blockchain transaction requests, wherein each blockchain transaction request includes at least a recipient blockchain address, a funding blockchain address, and a payment amount, where the recipient blockchain address is generated using the same public key for each blockchain transaction request, and a total of the payment amount included in each of the blockchain transaction requests is based on the transaction amount; and electronically transmitting, by a transmitter of the processing server, each of the two or more blockchain transaction requests to a node in a blockchain network associated with a separate blockchain.

A system for processing a multi-account check includes: a receiver of a processing server configured to receive a first authorization request transmitted via payment rails, wherein the first authorization request is formatted according to one or more standards and includes a plurality of data elements configured to store transaction data, the transaction data including at least a transaction amount, an account identifier, and a check number; a processing device of the processing server configured to identify a blockchain associated with the account identifier, wherein the blockchain includes a plurality of blocks, each block includes a block header and one or more blockchain data values, and a blockchain data value included in one of the plurality of blocks includes the check number, and generate two or more additional authorization requests, wherein each of the additional authorization requests are formatted according to the one or more standards and includes a plurality of data elements configured to store at least a payment amount, an alternate account number, and an alternate check number, the alternate account number included in each of the additional authorization requests is unique among the additional authorization requests, and a total of the payment amount included in each of the additional authorization requests is based on the transaction amount; and a transmitter of the processing server configured to electronically transmit each of the generated two or more additional authorization requests to a financial institution associated with the alternate account number included in the respective additional authorization request.

Another system for processing a multi-account check includes: a receiver of a processing server configured to receive a first authorization request transmitted via payment rails, wherein the first authorization request is formatted according to one or more standards and includes a plurality of data elements configured to store transaction data, the transaction data including at least a transaction amount, an account identifier, and a check number; a processing device of the processing server configured to identify a blockchain associated with the account identifier, wherein the blockchain includes a plurality of blocks, each block includes a block header and one or more blockchain data values, and a blockchain data value included in one of the plurality of blocks includes the check number, and generate two or more blockchain transaction requests, wherein each blockchain transaction request includes at least a recipient blockchain address, a funding blockchain address, and a payment amount, where the recipient blockchain address is generated using the same public key for each blockchain transaction request, and a total of the payment amount included in each of the blockchain transaction requests is based on the transaction amount; and a transmitter of the processing server configured to electronically transmit each of the two or more blockchain transaction requests to a node in a blockchain network associated with a separate blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
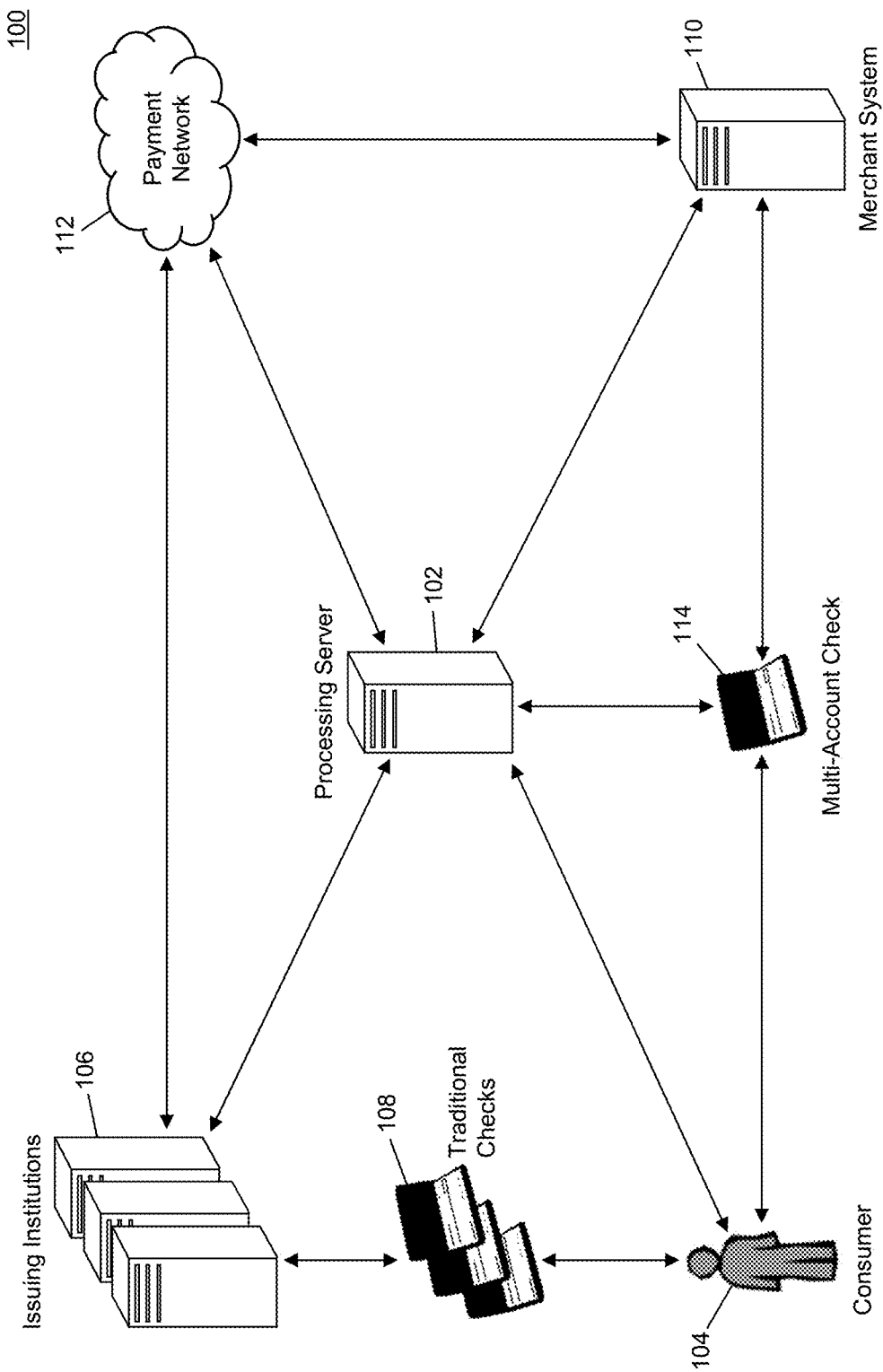
FIG. 1 is a block diagram illustrating a high level system architecture for processing transactions funded via multi-account checks in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Multi-Account Check Processing

FIG. 1 illustrates a system 100 for the processing of a payment transaction funded via a multi-account check that utilizes a blockchain for storage of data related thereto used in the processing.

The system 100 may include a processing server 102. The processing server 102, discussed in more detail below, may be configured to provide a series of multi-account checks 114 to a consumer 104 that can be used to fund a payment transaction via multiple transaction accounts that are associated therewith. In the system 100, the consumer 104 may have multiple transaction accounts issued thereto by one or more issuing institutions 106. Each issuing institution 106 may be a financial institution or other entity configured to issue transaction accounts that may be used to fund electronic payment transactions. As part of the issuing of a transaction account to the consumer 104, each of the issuing institutions 106 may issue a series of traditional checks 108 to the consumer 104 associated with an issued transaction account. A traditional check 108 may be a payment instrument that, when presented to a merchant system 110 as part of the payment of a payment transaction, the transaction is funded via the corresponding transaction account.

In a payment transaction where a traditional check 108 is used, the traditional check 108 may be presented to the merchant system 110, which may read an account number and routing number therefrom, such as using a magnetic ink reader configured to read the data printed on the traditional check 108 using magnetic ink. The account number and routing number may be provided to a payment network 112, discussed in more detail below, which may process the payment transaction. Part of the processing of the payment transaction may include routing the transaction data to the issuing institution 106 that issued the traditional check 108 used in the transaction using the routing number, where the issuing institution 106 may then approve or deny the transaction (e.g., based on amount of available funds in the transaction account associated with the traditional check 108).

In the system 100, the consumer 104 may be issued a plurality of different sets of traditional checks 108, where each set is associated with a different transaction account. The consumer 104 may have a desire to use a single check in place of presenting multiple checks in order to fund a payment transaction through multiple transaction accounts. The consumer 104 may request a multi-account check 114 from the processing server 102. The request may be submitted to the processing server 102 using a suitable communication network and method. For instance, the consumer 104 may use a computing device (e.g., smart phone, wearable computing device, desktop computer, tablet computer, laptop computer, etc.) to submit a request to the processing server 102 via a web page, application program, or other interface associated therewith. The consumer 104 may provide account details for each of the transaction accounts to which the consumer 104 wants the multi-account check 114 to be associated.

In some cases, the account details may include the data printed on each of the traditional checks 108 (e.g., routing numbers, account numbers, check numbers). In other cases, the account details may include identifying information and/or authentication information associated with the transaction account. In such cases, the processing server 102 may request the check information from the respective issuing institution 106 using the account details provided by the consumer 104. For instance, the authentication information may be used to ensure that the consumer 104 is authorized for use of the transaction account, while the identifying information may be used to identify the transaction account being selected by the consumer 104. In these cases, the issuing institution 106 may provide the account number and check numbers for the traditional checks 108 issued on the selected transaction accounts to the processing server 102.

Once the processing server 102 has received check numbers and account numbers for the consumer's selected transaction accounts, the processing server 102 may create a series of multi-account checks 114 for the consumer 104. In an exemplary embodiment, data associated with the issuing of multi-account checks 114 to the consumer 104 may be stored in a blockchain. The blockchain may be managed via a blockchain network, which may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In some embodiments, the processing server 102 may be a node. In other embodiments, the processing server 102 may be in communication with a node using a suitable communication network and method.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network prior to the generation and addition of a new block to the blockchain in order for the change to be made permanent. Computational and communication limitations may make such a modification exceedingly difficult, if not impossible, thus rendering the blockchain immutable.

Each blockchain data value may correspond to check data. A blockchain data value may include an account number and check number associated with a traditional check 108 or a multi-account check 114. In some cases, a single blockchain may be associated with a single consumer 104, where each blockchain data value included therein includes data for a check associated with the consumer 104. In other cases, blockchain data values in a blockchain may be associated with multiple consumers 104, where each blockchain data value may include information identifying the consumer 104. For instance, each consumer 104 that utilizes the processing server 102 may be provided with a unique identifier, such as a registration number, username, e-mail address, telephone number, etc., which may be included in all blockchain data values associated therewith.

When the consumer 104 registers with the processing server 102 for multi-account checks 114, a blockchain data value may be created and added to the blockchain for each of the transaction accounts that are to be associated with the multi-account check 114. The blockchain data value may include at least the account number and a plurality of check numbers associated with the respective traditional checks 108. In some cases, a single blockchain data value may be created for each check number. In other cases, a range of check numbers may be included in a single blockchain data value. A blockchain data value may be also be created and added to the blockchain that includes an account number and check number(s) for the multi-account checks 114. The account number associated with the multi-account checks 114 may be unique to the multi-account checks 114. In some cases, the account number may be based on the account number for one or more of the associated transaction accounts. In other cases, the account number may be random or pseudo-random.

The processing server 102 (e.g., or other device operating on behalf of or using instructions provided by the processing server 102) may print a plurality of physical checks, where each physical check is printed with the account number and one of the check numbers for the multi-account checks 114. In some cases, each multi-account check 114 may have a routing number printed thereon, where the routing number is associated with the processing server 102 such that payment transactions that are to be funded using the multi-account check 114 may be routed to the processing server 102 for processing. The multi-account checks 114 may be distributed to the consumer 104 using a suitable distribution method as will be apparent to persons having skill in the relevant art.

The consumer 104 may receive the multi-account checks 114 and may then proceed to use them when conducting electronic payment transactions. To use a multi-account check 114, the consumer 104 may present a multi-account check 114 to a merchant system 110 to fund a payment transaction in the same manner as the consumer 104 would use for a traditional check 108. The merchant system 110 may read the account number, routing number, and check number from the multi-account check 114 using a suitable method, such as the reading of magnetic ink printed on the multi-account check 114. The merchant system 110 may include the account number, routing number, and check number in transaction data that is submitted to the payment network 112 for processing of the electronic payment transaction.

In some embodiments, the merchant system 110 may submit the transaction data directly to the payment network 112 using payment rails associated therewith. In other embodiments, the merchant system 110 may submit the transaction data to an intermediate entity, such as an acquiring institution or a gateway processor. The transaction data may be included in a transaction message that is submitted to the payment network 112 via payment rails associated therewith. The transaction message may be a specially formatted data message that is formatted according to one or more standards governing the interchange of financial transaction messages, such as the International Organization of Standardization's ISO 8583 or ISO 20022 standards. In some cases, the merchant system 110 may generate the transaction message. In other cases, the merchant system 110 may forward the transaction data to an intermediate entity, such as an acquiring institution, which may generate the transaction message that includes the transaction data and forward the transaction message to the payment network 112.

The transaction message may include a message type indicator indicating a type of the transaction message, such as an authorization request or authorization response, as may be dictated via the applicable standards. The transaction message may also include a plurality of data elements, where each data element is configured to store transaction data, which may be specified by the applicable standards. The transaction data stored in the data elements of the transaction message may include at least the account number, routing number, and check number for the multi-account check 114 (e.g., which may be stored in a single data element or across multiple data elements), as well as any other data used in the processing of the payment transaction, such as a transaction amount, transaction time, transaction date, currency type, transaction type, merchant identifier, merchant category code, product data, issuer data, acquirer data, loyalty data, reward data, offer data, etc.

The payment network 112 may receive the transaction message and identify the routing number stored therein. The payment network 112 may then route the transaction message to the appropriate entity based on the routing number. For payment transactions where a multi-account check 114 is used, the transaction message may be routed to the processing server 102 and transmitted thereto by the payment network 112 using any suitable communication network and method, such as via the payment rails associated with the payment network 112. The processing server 102 may thus receive the transaction message for the payment transaction, which may be an authorization request.

The processing server 102 may receive the authorization request and, through the account number included therein, identify the transaction accounts associated with the multi-account check 114 used in the transaction. For example, the processing server 102 may identify the blockchain data value corresponding to the multi-account check 114 presented in the transaction based on the account number and check number, and may identify corresponding blockchain data values that include account numbers and routing numbers for the respective traditional checks 108. The processing server 102 may then initiate additional transactions to facilitate funding of the multi-account check 114 payment transaction via the underlying transaction accounts.

In some embodiments, the underlying transaction accounts may be used to fund the multi-account check 114 payment transaction, also referred to herein as the "main" or "initial" payment transaction, via standard electronic payment transactions. In such embodiments, the processing server 102 may generate an authorization request for a new payment transaction, also referred to herein as a "sub," "subsequent," "secondary," or "alternate" payment transaction, for each of the transaction accounts that are tied to the multi-account check 114. The authorization request may include the account number and any other account details for the respective transaction account (e.g., the check number for the respective traditional check 108). In some instances, the authorization requests for the secondary payment transactions may include transaction data from the main authorization request. The transaction amount included in each secondary payment transaction may be based on the transaction amount included in the main payment transaction. In some cases, the transaction amount from the main payment transaction may be divided equally among the secondary payment transactions. In other cases, the portion of the main transaction amount paid using the transaction accounts may be set by the consumer 104, such as during the creation of the multi-account checks 114. For example, the consumer may specify that one transaction account pays for 40% of the main transaction while two other transaction accounts each pay for 30% of the main transaction.

Once the authorization requests are generated, the processing server 102 may initiate processing of the secondary payment transactions. In some embodiments, the processing server 102 may submit the authorization requests to the payment network 112 using payment rails associated therewith for processing using traditional methods or systems. In other embodiments, the processing server 102 may operate as a payment network with respect to the secondary payment transactions, such as by forwarding the authorization requests to the corresponding issuing institutions 106 for approval or denial. Processing of the secondary payment transactions may result in the processing server 102 receiving authorization responses for each of the secondary payment transactions, where each authorization response may include a data element configured to store a response code that indicates if the payment transaction is approved or denied. If all of the secondary payment transactions are approved, the main payment transaction may be approved. Approval of the main payment transaction may result in the issuing institutions 106 debiting the transaction accounts accordingly, and the processing server 102 generating an authorization response for the main payment transaction that is returned to the processing server 102 that includes a data element configured to store a response code indicating approval of the payment transaction. The authorization response may be submitted to the payment network 112, which may forward the approval to the merchant system 110, which may then finalize the payment transaction with the consumer 104, such as by furnishing transacted-for goods or services to the consumer 104.

In instances where one or more of the secondary payment transactions may be denied, the main payment transaction may also be denied. In such an instance, the processing server 102 may generate an authorization response that includes a response code indicating decline of the payment transaction, which may be submitted to the payment network 112 and processed accordingly. In these cases, the processing server 102 may inform the issuing institution 106 for each secondary payment transaction was approved to indicate that the secondary payment transaction should be reversed or otherwise not processed.

In some embodiments, the secondary payment transactions may be blockchain transactions. In such embodiments, the transaction accounts registered by the consumer 104 may be blockchain wallets configured for use in conducting blockchain transactions. In these cases, traditional checks 108 may be replaced by blockchain wallets, or blockchain wallets may be associated with a transaction account for which traditional checks 108 are issued to the consumer 104. For example, an issuing institution 106 may issue traditional checks 108 to the consumer 104 for a transaction account but also accommodate blockchain transactions.

A blockchain wallet may be associated with a blockchain network that is used to transmit and receive blockchain currency in electronic payment transactions conducted via the blockchain network. A blockchain wallet may be an application program that is executed by a computing device possessed by the consumer 104. A blockchain wallet may include a private key of a cryptographic key pair that is used to generate digital signatures that serve as authorization by the consumer 104 for a blockchain transaction, where the digital signature can be verified by the blockchain network using the public key of the cryptographic key pair. In some cases, the term "blockchain wallet" may refer specifically to the private key. In some embodiments, an issuing institution 106 may store the consumer's private key. In other embodiments, the private key may be stored on the computing device of the consumer 104. The computing device may be any type of device suitable for performing the functions discussed herein, such as a desktop computer, laptop computer, tablet computer, notebook computer, cellular phone, smart phone, smart watch, smart television, wearable computing device, implantable computing device, etc.

Blockchain transactions may be processed and stored on a blockchain dedicated thereto, which may be different from the blockchain used to store data for multi-account checks. In such blockchains, each blockchain data value may correspond to a blockchain transaction. A blockchain transaction may consist of at least: a digital signature of the sender of currency (e.g., the consumer 104) that is generated using the sender's private key, a blockchain address of the recipient of currency (e.g., the merchant system 110) generated using the recipient's public key, and a blockchain currency amount that is transferred. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. In some cases, a blockchain transaction may also include the sender's public key, for use by any entity in validating the transaction. For the processing of a blockchain transaction, such data may be provided to a node in the blockchain network, either by the sender (e.g., via the computing device) or the recipient (e.g., by the merchant system 110). The node may verify the digital signature and the sender's access to the funds, and then include the blockchain transaction in a new block. The new block may be validated by other nodes in the blockchain network before being added to the blockchain and distributed to all of the nodes in the blockchain network.

In a standard blockchain transaction, the consumer 104 may thus generate a digital signature using the computing device of the consumer 104 using the private key thereof. The merchant system 110 may generate a blockchain address using its public key, which may be provided to the computing device. In some cases, the merchant system 110 may provide the computing device with its public key, where the computing device may generate the blockchain address. The computing device may then submit the required information to a node in the blockchain network for processing. In some instances, the node may return a blockchain transaction identifier to the computing device, which may be a value that is unique to that blockchain transaction for identification thereof. In such traditional transactions, the merchant system 110 is required to generate blockchain address or distribute its public key, and, in some cases, may be required to submit the transaction data directly to blockchain networks.

In the system 100, the processing server 102 may be configured to perform the secondary payment transactions as blockchain transactions. In such embodiments, the processing server 102 may identify recipient addresses for the merchant system 110 for each blockchain transaction, which may be included in the authorization request, provided directly by the merchant system 110, or identified using a public key associated with the merchant system 110 that may be included in the authorization request or already stored by the processing server 102, such as from an earlier transaction or during a registration process by the merchant system 110. The processing server 102 may also generate or otherwise identify a digital signature for each of the blockchain wallets associated with the multi-account check 114, as may be identified using the blockchain data values identified through the multi-account check 114 account number. In some cases, the blockchain data values may include digital signatures or the private keys used to generate digital signatures. In other cases, the blockchain data values may include data used to communicate with the issuing institutions 106 or consumer 104 (e.g., via one or more computing devices) to request digital signatures.

The processing server 102 may then submit blockchain transactions for each secondary payment transaction to a node in a blockchain network for processing. Each blockchain transaction may include at least a digital signature to prove access to sufficient blockchain currency by the consumer 104 and a recipient address for the merchant system 110, as well as a blockchain currency amount. The blockchain currency amount may be based on the transaction amount of the main payment transaction, such as discussed above. The blockchain transactions may be verified and added to the blockchain. If verification of any blockchain transaction is unsuccessful, the processing server 102 may deny the main payment transaction, as discussed above. If all of the secondary blockchain transactions are successful, then the processing server 102 may approve the main payment transaction, as also discussed above.

The methods and systems discussed herein allow for the processing of a payment transaction using a single check that is funded via multiple transaction accounts. A centralized processing server 102 enables such a system to be implemented without modification to issuing institutions 106, merchant systems 110, and payment networks 112, resulting in easy adoption while also providing consumers 104 with the convenience of needing only a single multi-account check 114 to have a payment transaction funded via multiple transaction accounts.

Processing Server

Figure 2:
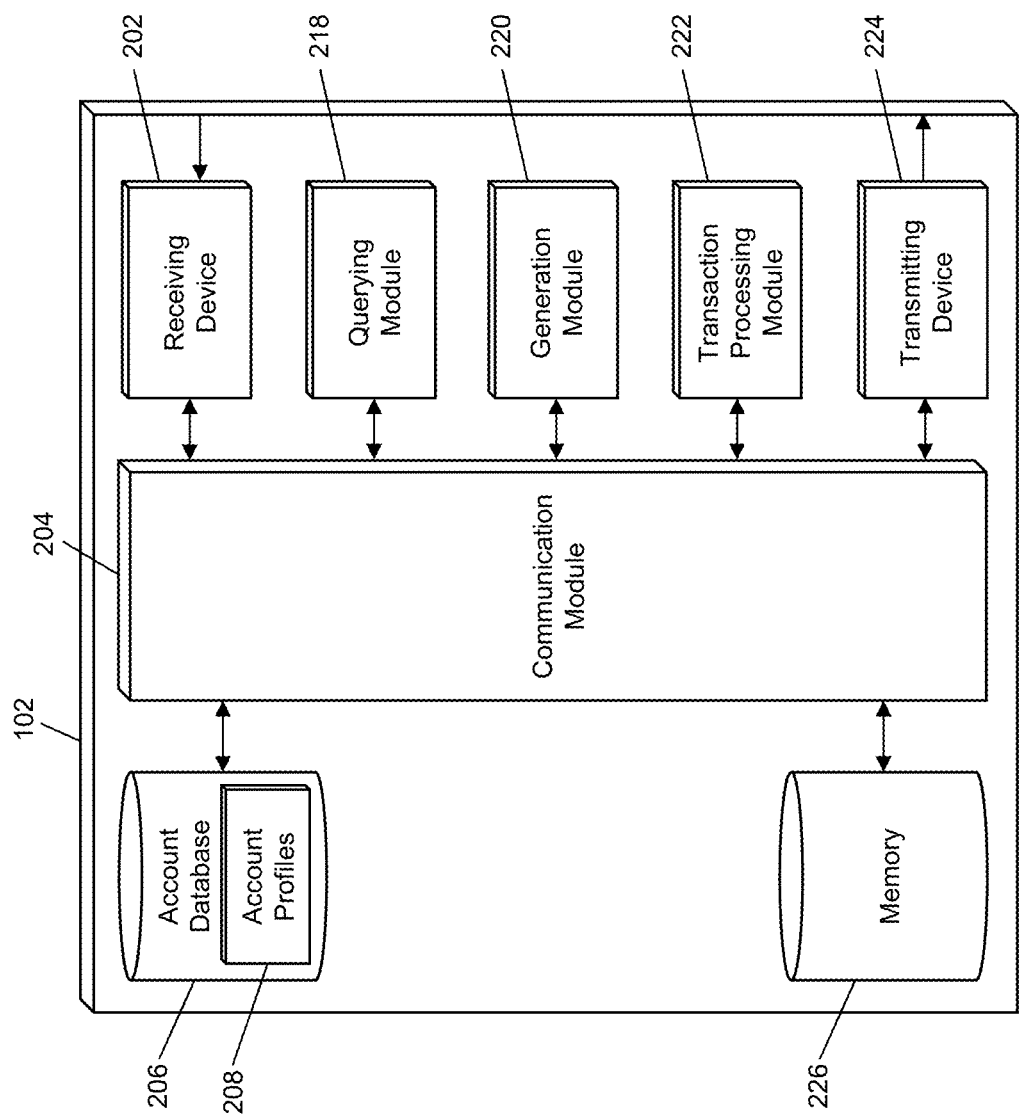
FIG. 2 is a block diagram illustrating the processing server of the system of FIG. 1 for the processing of multi-account checks in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from issuing institutions 106, merchant systems 110, payment networks 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 106 and/or computing devices associated with a consumer 104, which may be superimposed or otherwise encoded with account details for transaction accounts, which may include account numbers, routing numbers, and check numbers for traditional checks 108, or may, in some cases, including private keys, digital signatures, or other data associated with blockchain wallets. The receiving device 202 may also be configured to receive data signals electronically transmitted by merchant systems 110, which may be superimposed or otherwise encoded with public keys or recipient blockchain addresses. The receiving device 202 may also be configured to receive data signals electronically transmitted by payment networks 112 and issuing institutions 106 that are superimposed or otherwise encoded with transaction messages for payment transactions.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, transaction processing module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to one or more transaction accounts. For instance, an account profile 208 may be associated with each transaction account registered by the consumer 104 and have account numbers, check numbers, routing numbers, or other associated data stored therein. In some cases, account profiles 208 may be associated with transaction accounts issued to merchant systems 110, and may include data for use in ensuring payment transactions are paid toward the respective merchant system 110. In some instances, an account profile 208 may store data regarding a blockchain wallet associated with a corresponding consumer 104 or merchant system 110, which may include public keys, private keys, addresses, or other data.

The processing server 102 may include a querying module 218. The querying module 218 may be configured to execute queries on databases to identify information. The querying module 218 may receive one or more data values or query strings, and may execute a query string based thereon on an indicated database, such as the account database 206, to identify information stored therein. The querying module 218 may then output the identified information to an appropriate engine or module of the processing server 102 as necessary. The querying module 218 may, for example, execute a query on the account database 206 to identify an account profile 208 associated with a received multi-account check 114 to identify the account details of transaction accounts associated therewith for use in secondary payment transactions.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate digital signatures and blockchain addresses using private and public keys, respectively, using suitable algorithms. In some cases, the generation module 220 may also be configured to verify digital signatures using algorithms used in the generation of digital signatures, using a public key of a cryptographic key pair that includes the private key used to generate the digital signature. The generation module 220 may also be configured to generate transaction messages, including authorization requests and authorization responses, for main and secondary payment transactions as discussed herein.

The processing server 102 may also include a transaction processing module 222. The transaction processing module 222 may be configured to perform functions for the processing server 102 related to the processing of electronic payment transactions as discussed herein. Such functions may include, for example, the forwarding of authorization requests and authorization responses, the generation of authorization responses, the identification of issuing institutions 106, the calculation of a fiat currency amount or blockchain currency amount via an exchange rate, the calculation of transaction amounts for secondary payment transactions, etc.

The processing server 102 may also include a transmitting device 224. The transmitting device 224 may be configured to transmit data over one or more networks via one or more network protocols. In some instances, the transmitting device 224 may be configured to transmit data to issuing institutions 106, merchant systems 110, payment networks 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to issuing institutions 106 that are superimposed or otherwise encoded with requests for account details, which may include account numbers, identification data, authentication data, etc. The transmitting device 224 may also be configured to electronically transmit data signals to issuing institutions 106 and payment networks 112 that may be superimposed or otherwise encoded with transaction messages, which may include authorization requests or authorization responses for main and secondary payment transactions. The transmitting device 224 may be further configured to electronically transmit data signals to merchant systems 110 and computing devices associated with consumers 104 that are superimposed or otherwise encoded with request for digital signatures, public keys, private keys, blockchain addresses, or other data associated with blockchain transactions. In embodiments where blockchain transactions are used, the transmitting device 224 may also be configured to electronically transmit data signals to nodes in a blockchain network that are superimposed or otherwise encoded with data for use in processing blockchain transactions.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, credentials for validation, usage rule templates, communication data for blockchain nodes, communication data for computing devices, routing information for transaction messages, transaction message formatting standards, currency exchange rate data and algorithms, multi-account check 114 generation rules, etc.

Process for Processing of Multi-Account Checks

Figure 3:
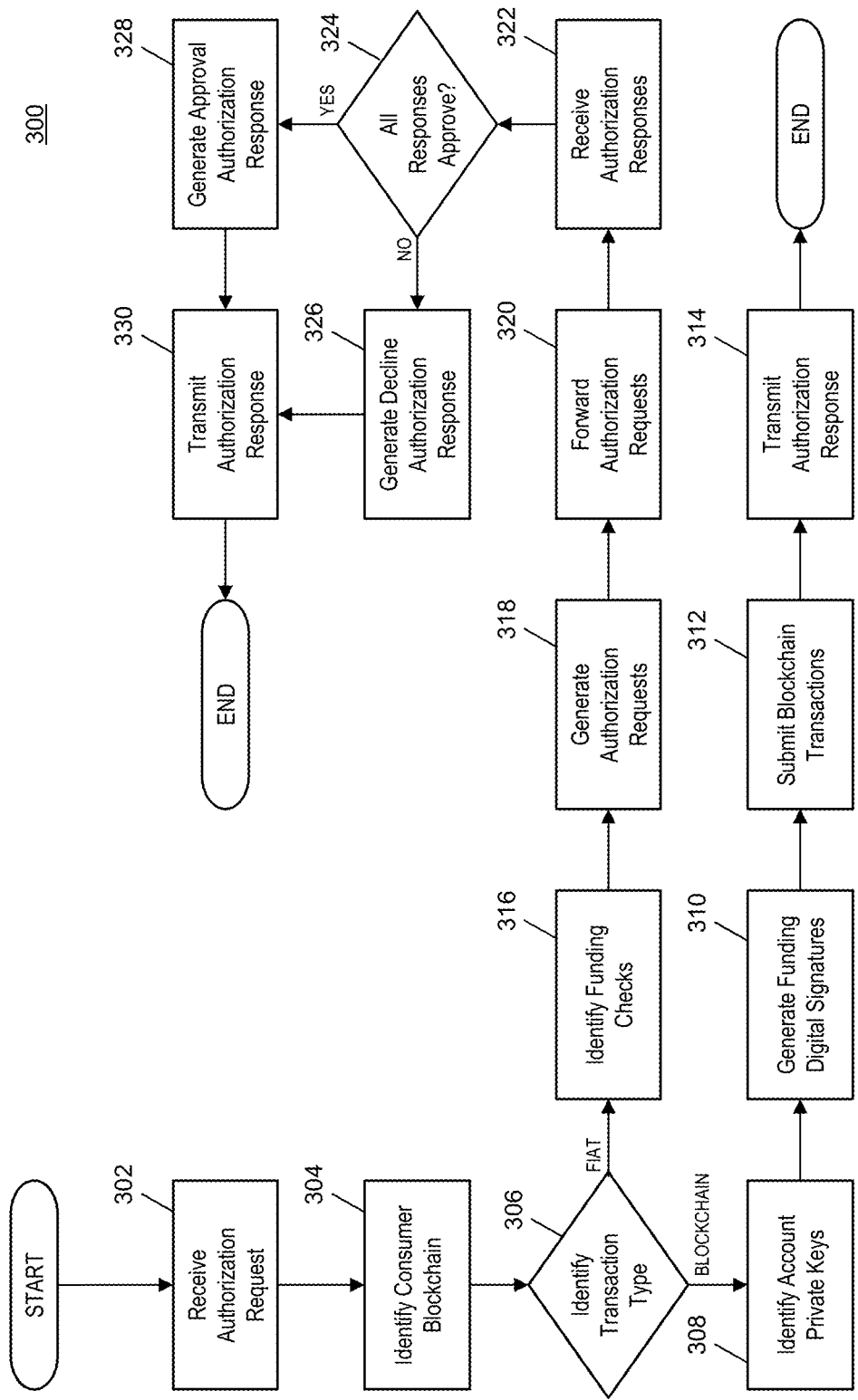
FIG. 3 is a flow diagram illustrating a process for processing multi-account checks as executed by the processing server of FIG. 2 in accordance with exemplary embodiments.

FIG. 3 illustrates an example process 300 for execution by the processing server 102 of FIG. 2 in the system 100 for the processing of payment transactions involving multi-account checks 114 for funding using multiple accounts.

In step 302, the receiving device 202 of the processing server 102 may receive an authorization request for a payment transaction from the payment network 112. The authorization request may include a plurality of data elements including data elements configured to store at least a transaction amount and an account number and check number for a multi-account check 114. In step 304, the processing server 102 may identify a blockchain associated with the consumer 104 involved in the transaction based on the account number or other data included in the authorization request. The consumer blockchain may be stored in the processing server 102 (e.g., in the memory 226 or an account profile 208 associated with the consumer 104) or retrieved from a node in a blockchain network.

In step 306, the processing server 102 may identify a type of transaction to be used for the secondary payment transactions. In some cases, the processing server 102 may identify the type based on data included in the authorization request, such as may be specified by the consumer 104 or merchant system 110. In other cases, the type may be specified in the account profile 208 or the consumer 104 or the consumer blockchain. For instance, the blockchain data values stored in the consumer blockchain may include blockchain wallet data or traditional check 108 data, which may be used for the identification.

If, in step 306, the processing server 102 determines that the secondary transactions should be blockchain transactions, then, in step 308, the processing server 102 may identify private keys for the underlying blockchain wallets associated with the multi-account check 114. In some cases, the private keys may be stored in the blockchain data values included in the consumer blockchain. In other cases, the private keys may be stored in the account profile 208 and may be identified using data included in the blockchain data values of the consumer blockchain. In step 310, the generation module 220 of the processing server 102 may generate a digital signature using each of the identified private keys. In step 312, the transmitting device 224 of the processing server 102 may submit a blockchain transaction for each blockchain wallet to a node in the blockchain network, where the blockchain transaction includes a digital signature, recipient address, and currency amount. The receiving device 202 of the processing server 102 may receive confirmation of the blockchain transactions and then, in step 314, the processing server 102 may (e.g., via the generation module 220) generate an authorization response for the main payment transaction and transmit (e.g., via the transmitting device 224) the authorization response to the payment network 112.

If, in step 306, the processing server 102 determines that the secondary transactions are traditional (e.g., fiat) payment transactions, then, in step 316, the processing server 102 may identify the traditional checks 108 that are associated with the multi-account check 114 using the blockchain data values in the consumer blockchain. In step 318, the generation module 220 of the processing server 102 may generate an authorization request for a secondary payment transaction for each of the traditional checks 108, where each authorization request may include the account details for the respective traditional check 108 and a transaction amount based on the transaction amount in the main payment transaction. In step 320, the transmitting device 224 of the processing server 102 may forward the authorization requests to the associated issuing institutions 106.

In step 322, the receiving device 202 of the processing server 102 may receive authorization responses for each of the secondary payment transactions from the corresponding issuing institutions 106. In step 324, the processing server 102 may determine if all of the authorization responses indicate approval of the respective secondary payment transactions, as may be identified based on the response code stored in a corresponding data element in the authorization response. If at least one of the secondary payment transactions is declined, then, in step 326, the generation module 220 may generate an authorization response for the main payment transaction that includes a response code indicating decline of the payment transaction. If all of the secondary payment transactions are approved, then, in step 328, the generation module 220 may generate an authorization response for the main payment transaction that includes a response code indicating approval of the payment transaction. In step 330, the transmitting device 224 of the processing server 102 may electronically transmit the authorization response for the main payment transaction to the payment network 112.

First Exemplary Method for Processing a Multi-Account Check

Figure 4:
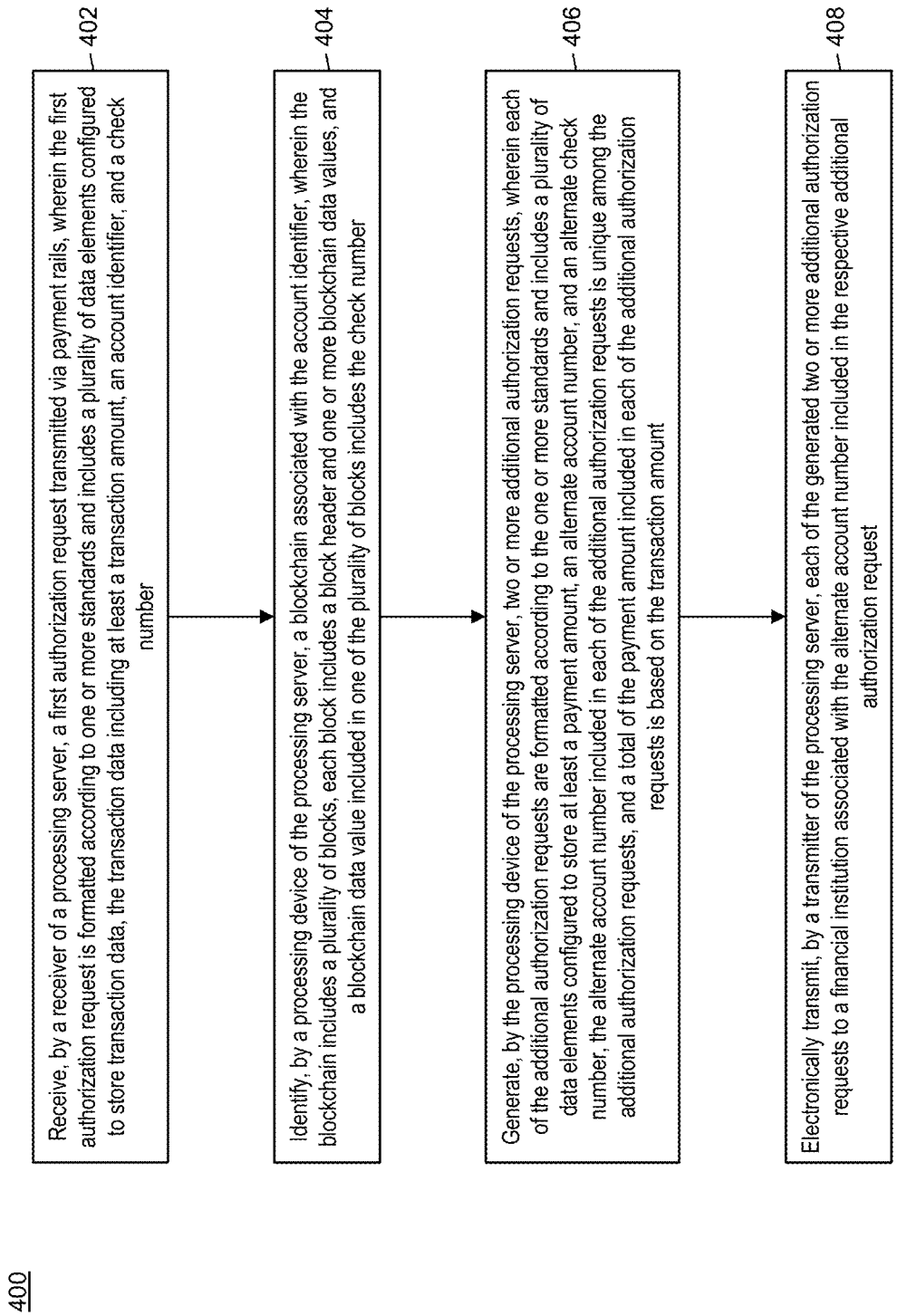
FIGS. 4 and 5 are flow charts illustrating exemplary methods for processing multi-account checks in accordance with exemplary embodiments.

FIG. 4 illustrates a method 400 for the processing of a multi-account check for a payment transaction funded via multiple transaction accounts through separate payment transactions associated therewith.

In step 402, a first authorization request transmitted via payment rails may be received by a receiver (e.g., the receiving device 202) of a processing server (e.g., the processing server 102), wherein the first authorization request is formatted according to one or more standards and includes a plurality of data elements configured to store transaction data, the transaction data including at least a transaction amount, an account identifier, and a check number. In step 404, a blockchain associated with the account identifier may be identified by a processing device of the processing server, wherein the blockchain includes a plurality of blocks, each block includes a block header and one or more blockchain data values, and a blockchain data value included in one of the plurality of blocks includes the check number.

In step 406, two or more additional authorization requests may be generated by the processing device of the processing server, wherein each of the additional authorization requests are formatted according to the one or more standards and includes a plurality of data elements configured to store at least a payment amount, an alternate account number, and an alternate check number, the alternate account number included in each of the additional authorization requests is unique among the additional authorization requests, and a total of the payment amount included in each of the additional authorization requests is based on the transaction amount. In step 408, each of the generated two or more additional authorization requests may be electronically transmitted by a transmitter (e.g., the transmitting device 224) of the processing server to a financial institution (e.g., issuing institution 106) associated with the alternate account number included in the respective additional authorization request.

In one embodiment, the method 400 may further include: receiving, by the receiver of the processing server, an additional authorization response for each of the transmitted additional authorization requests, wherein each additional authorization response is formatted according to the one or more standards and includes a plurality of data elements configured to store at least a response code indicating approval or denial; and electronically transmitting, by the transmitter of the processing server, an overall authorization response via payment rails, wherein the overall authorization response is formatted according to the one or more standards and includes a plurality of data elements configured to store at least an overall response code that indicates approval or denial based on the response code included in each of the additional authorization responses. In some embodiments, the method 400 may also include: receiving, by the receiver of the processing server, a plurality of check registration messages, wherein each check registration message includes a corresponding account number and a group of corresponding check numbers, and the alternate account number and alternate check number included in each of the additional authorization requests is included in one of the check registration messages; and transmitting, to a node in a blockchain network associated with the blockchain, a transaction submission for each corresponding check number in the group of corresponding check numbers for each of the plurality of check registration messages, wherein the transaction submission includes the respective corresponding check number and corresponding account number.

In one embodiment, the method 400 may further include: generating, by the processing device of the processing server, a plurality of multi-check numbers; and electronically transmitting, by the transmitter of the processing server, a transaction submission to a node in a blockchain network associated with the blockchain for each of the plurality of multi-check numbers, wherein each transaction submission includes the respective multi-check number and the account identifier, wherein one of the multi-check numbers corresponds to the check number included in the first authorization request. In a further embodiment, the method 400 may even further include printing, by a printing device, a paper check for each of the plurality of multi-check numbers, wherein the paper check displays at least the respective multi-check number and the account identifier.

Second Exemplary Method for Processing a Multi-Account Check

Figure 5:
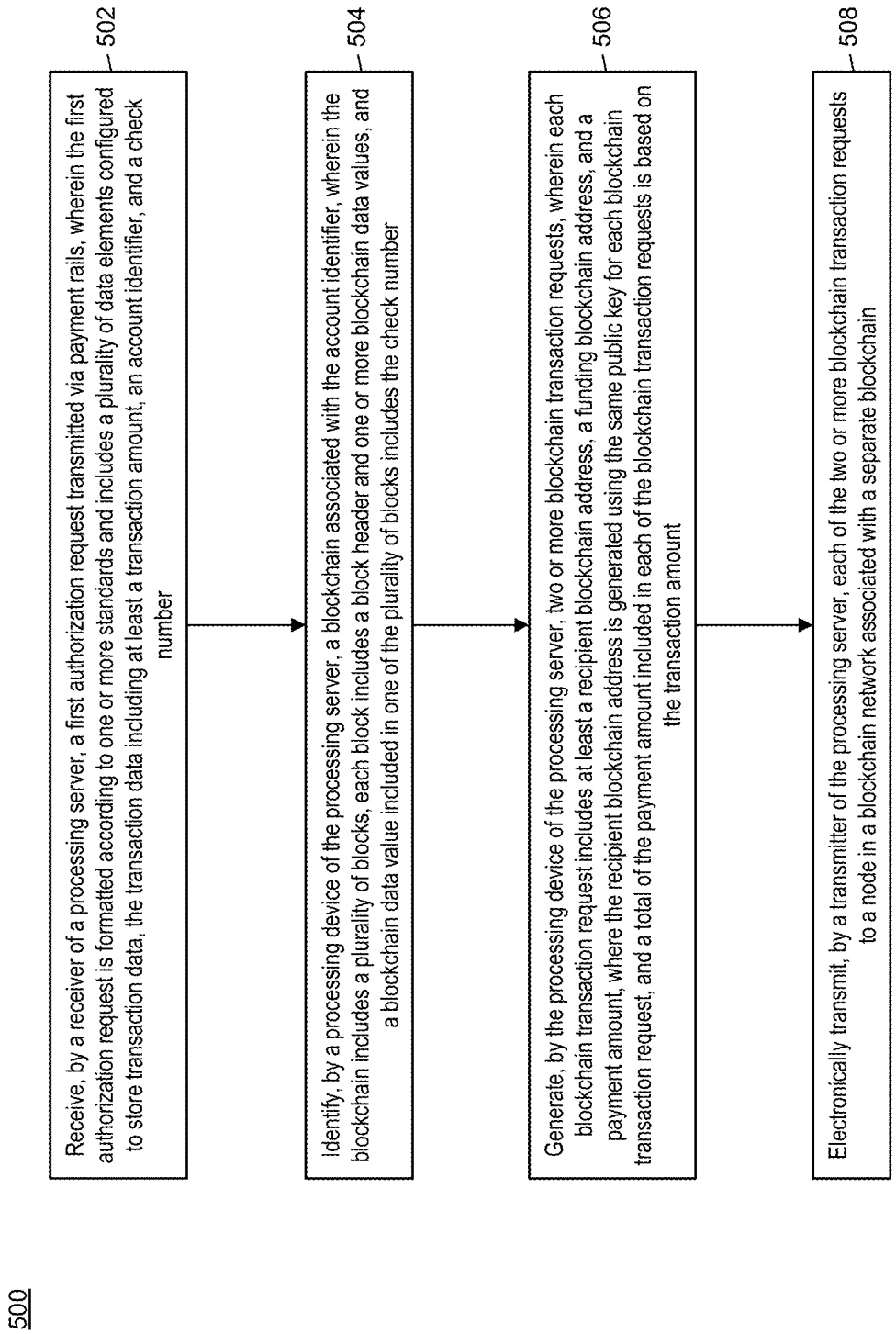

FIG. 5 illustrates a method 500 for the processing of a multi-account check for a payment transaction funded through multiple blockchain transactions.

In step 502, a first authorization request transmitted via payment rails may be received by a receiver (e.g., the receiving device 202) of a processing server (e.g., the processing server 102), wherein the first authorization request is formatted according to one or more standards and includes a plurality of data elements configured to store transaction data, the transaction data including at least a transaction amount, an account identifier, and a check number. In step 504, a blockchain associated with the account identifier may be identified by a processing device of the processing server, wherein the blockchain includes a plurality of blocks, each block includes a block header and one or more blockchain data values, and a blockchain data value included in one of the plurality of blocks includes the check number.

In step 506, two or more blockchain transaction requests may be generated by the processing device of the processing server, wherein each blockchain transaction request includes at least a recipient blockchain address, a funding blockchain address, and a payment amount, where the recipient blockchain address is generated using the same public key for each blockchain transaction request, and a total of the payment amount included in each of the blockchain transaction requests is based on the transaction amount. In step 508, each of the two or more blockchain transaction requests may be electronically transmitted by a transmitter (e.g., the transmitting device 224) of the processing server to a node in a blockchain network associated with a separate blockchain.

In one embodiment, the method 500 may further include generating, by the processing device of the processing server, a digital signature for each of the two or more blockchain transaction requests using a private key of a cryptographic key pair, wherein each of the two or more blockchain transaction requests includes the digital signature generated for the respective blockchain transaction request. In some embodiments, the transaction data included in the first authorization request may further include the public key.

Computer System Architecture

Figure 6:
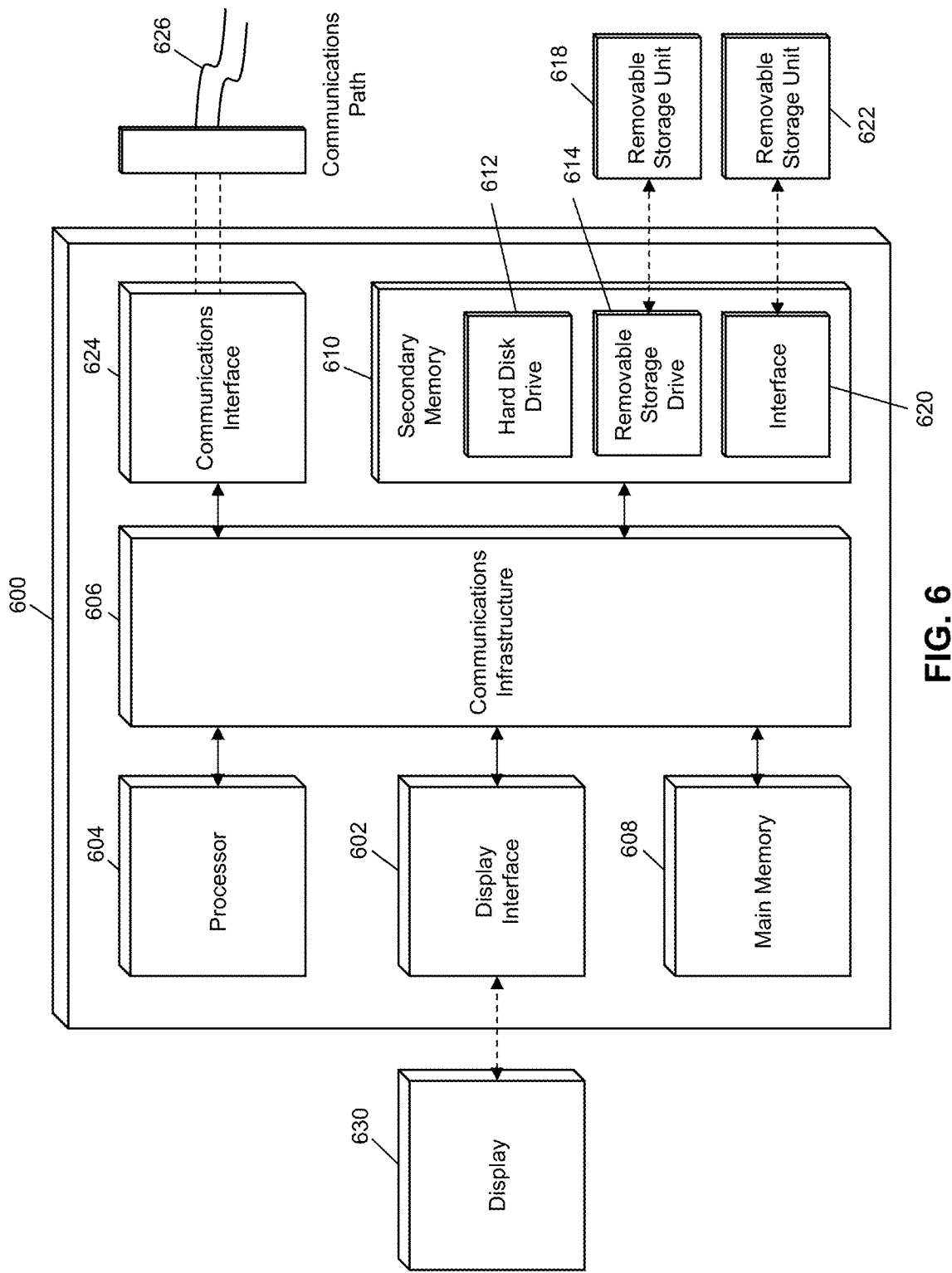
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for processing of multi-account checks. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing a multi-account check, comprising:

receiving, by a receiver of a processing server, a multi-account check request, from a computing device of a consumer, wherein the multi-account check request includes account details for each of a plurality of transaction accounts selected by the consumer for association with a multi-account check, said account details including at least check numbers and account numbers;

in response to receiving the multi-account check request, creating, by a processing device of a processing server, a series of multi-account checks associated with the plurality of transaction accounts;

creating, by the processing server, a blockchain data value for each transaction account of the plurality of transaction accounts associated with the multi-account checks, wherein each blockchain data value includes communication data used to communicate with a respective financial institution;

adding, by the processing server, each created blockchain data value to a blockchain network;

receiving, by the receiver of the processing server, a first authorization request transmitted via payment rails, from a merchant point of sale (POS) device, wherein the first authorization request is formatted according to one or more standards and includes a plurality of data elements storing transaction data, and wherein the transaction data includes at least a transaction amount, an account identifier, and a check number for a multi-account check from the created series of multi-account checks;

communicating with the blockchain network and identifying, by a processing device of the processing server, a blockchain in the blockchain network that is associated with the account identifier included in the first authorization request received from the merchant POS device, wherein the identified blockchain includes a plurality of blocks, each block including a block header and one or more blockchain data values, and a blockchain data value included in one of the plurality of blocks includes the check number included in the first authorization request;

generating, by the processing device of the processing server, an additional authorization request for a new payment transaction for each transaction account associated with the multi-account checks, wherein each additional authorization request includes a plurality of data elements that store at least a payment amount, an alternate account number, and an alternate check number, the alternate account number included in each additional authorization request is unique among the additional authorization requests, and a total of the payment amount included in each additional authorization request is based on the transaction amount; and electronically transmitting, by a transmitter of the processing server, (i) each of the generated additional authorization requests to a financial institution associated with the alternate account number included in the respective additional authorization request, and (ii) transaction information to a node in the blockchain network associated with the blockchain, wherein the financial institution is separate from the blockchain network.

2. The method of claim 1, further comprising:
receiving, by the receiver of the processing server, an additional authorization response for each of the transmitted additional authorization requests, wherein each additional authorization response is formatted according to the one or more standards and includes a plurality of data elements configured to store at least a response code indicating approval or denial; and electronically transmitting, by the transmitter of the processing server, an overall authorization response via payment rails, wherein the overall authorization response is formatted according to the one or more standards and includes a plurality of data elements configured to store at least an overall response code that indicates approval or denial based on the response code included in each of the additional authorization responses.

3. The method of claim 1, further comprising:
receiving, by the receiver of the processing server, a plurality of check registration messages, wherein each check registration message includes a corresponding account number and a group of corresponding check numbers, and the alternate account number and alternate check number included in each of the additional authorization requests is included in one of the check registration messages, wherein the transmission of the transaction information to the node in the blockchain network associated with the blockchain, includes transmitting a transaction submission for each corresponding check number in the group of corresponding check numbers for each of the plurality of check registration messages, wherein the transaction submission includes the respective corresponding check number and corresponding account number.

4. The method of claim 1, further comprising:
generating, by the processing device of the processing server, a plurality of multi-check numbers, wherein the transmission of the transaction data to the node in the blockchain network associated with the blockchain, includes transmitting a transaction submission for each of the plurality of multi-check numbers, wherein each transaction submission includes the respective multi-check number and the account identifier, and one of the multi-check numbers corresponds to the check number included in the first authorization request.

5. The method of claim 4, further comprising:
printing, by a printing device, a paper check for each of the plurality of multi-check numbers, wherein the paper check displays at least the respective multi-check number and the account identifier.

6. A system for processing a multi-account check, comprising:
a receiver of a processing server;
a processing device of the processing server; and
a transmitter of the processing server, wherein
the receiver is configured to receive a multi-account check request, from a computing device of a consumer, wherein the multi-account check request includes account details for each of a plurality of transaction accounts selected by the consumer for association with a multi-account check, said account details including at least check numbers and account numbers, the processing device is configured to (1) create, in response to receiving the multi-account check request, a series of multi-account checks associated with the plurality of transaction accounts, (2) create a blockchain data value for each transaction account of the plurality of transaction accounts associated with the multi-account checks, wherein each blockchain data value includes communication data used to communicate with a respective financial institution, and (3) add each created blockchain data value to a blockchain network, the receiver is further configured to receive a first authorization request transmitted via payment rails, from a merchant point of sale (POS) device, wherein the first authorization request is formatted according to one or more standards and includes a plurality of data elements storing transaction data, and wherein the transaction data includes at least a transaction amount, an account identifier, and a check number for a multi-account check from the created series of multi-account checks, the processing device is further configured to
communicate with the blockchain network and identify a blockchain, in the blockchain network, that is associated with the account identifier included in the first authorization request received from the merchant POS device, wherein the identified blockchain includes a plurality of blocks, each block including a block header and one or more blockchain data values, and a blockchain data value included in one of the plurality of blocks includes the check number included in the first authorization request, and generate an additional authorization request for a new payment transaction for each transaction account associated with the multi-account checks, wherein each additional authorization request includes a plurality of data elements that store at least a payment amount, an alternate account number, and an alternate check number, the alternate account number included in each additional authorization request is unique among the additional authorization requests, and a total of the payment amount included in each additional authorization request is based on the transaction amount; and the transmitter is configured to electronically transmit (i) each of the generated additional authorization requests to a financial institution associated with the alternate account number included in the respective additional authorization request, and (ii) transaction information to a node in a blockchain network associated with the blockchain, wherein the financial institution is separate from the blockchain network.

7. The system of claim 6, wherein the receiver of the processing server is further configured to receive an additional authorization response for each of the transmitted additional authorization requests, wherein each additional authorization response is formatted according to the one or more standards and includes a plurality of data elements configured to store at least a response code indicating approval or denial, and the transmitter of the processing server is further configured to electronically transmit an overall authorization response via payment rails, wherein the overall authorization response is formatted according to the one or more standards and includes a plurality of data elements configured to store at least an overall response code that indicates approval or denial based on the response code included in each of the additional authorization responses.

8. The system of claim 6, wherein the receiver of the processing server is further configured to receive a plurality of check registration messages, wherein each check registration message includes a corresponding account number and a group of corresponding check numbers, and the alternate account number and alternate check number included in each of the additional authorization requests is included in one of the check registration messages, wherein the transaction data, transmitted to to the node in the blockchain network associated with the blockchain, includes a transaction submission for each corresponding check number in the group of corresponding check numbers for each of the plurality of check registration messages, and wherein the transaction submission includes the respective corresponding check number and corresponding account number.

9. The system of claim 6, wherein the processing device of the processing server is further configured to generate a plurality of multi-check numbers, wherein the transaction data, transmitted to the node in the blockchain network associated with the blockchain, includes a transaction submission for each of the plurality of multi-check numbers, wherein each transaction submission includes the respective multi-check number and the account identifier, and wherein one of the multi-check numbers corresponds to the check number included in the first authorization request.

10. The system of claim 9, further comprising:

a printing device configured to print a paper check for each of the plurality of multi-check numbers, wherein the paper check displays at least the respective multi-check number and the account identifier.

\* \* \* \* \*